(12) United States Patent
Tamura et al.

(10) Patent No.: US 10,407,588 B2
(45) Date of Patent: Sep. 10, 2019

(54) COATING COMPOSITION AND COATED ARTICLE

(71) Applicant: DAIKIN INDUSTRIES, LTD., Osaka-Shi, Osaka (JP)

(72) Inventors: Eisuke Tamura, Osaka (JP); Yoshihiro Soda, Osaka (JP); Tomohiro Shiromaru, Osaka (JP); Seitaro Yamaguchi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 11 days.

(21) Appl. No.: 15/552,332

(22) PCT Filed: Feb. 19, 2016

(86) PCT No.: PCT/JP2016/054844
§ 371 (c)(1),
(2) Date: Aug. 21, 2017

(87) PCT Pub. No.: WO2016/147790
PCT Pub. Date: Sep. 22, 2016

(65) Prior Publication Data
US 2018/0037765 A1    Feb. 8, 2018

(30) Foreign Application Priority Data

Mar. 13, 2015    (JP) .................................. 2015-051060

(51) Int. Cl.
| | | |
|---|---|---|
| *C09D 127/18* | (2006.01) | |
| *C09D 5/02* | (2006.01) | |
| *C09D 127/20* | (2006.01) | |
| *C09D 201/04* | (2006.01) | |
| *C09D 7/40* | (2018.01) | |
| *C09D 7/61* | (2018.01) | |
| *C08L 27/18* | (2006.01) | |
| *C08K 3/22* | (2006.01) | |
| *C08K 3/36* | (2006.01) | |
| *C08K 3/40* | (2006.01) | |

(52) U.S. Cl.
CPC ............ *C09D 127/18* (2013.01); *C08L 27/18* (2013.01); *C09D 5/02* (2013.01); *C09D 7/40* (2018.01); *C09D 7/61* (2018.01); *C09D 127/20* (2013.01); *C09D 201/04* (2013.01); C08K 3/22 (2013.01); C08K 3/36 (2013.01); C08K 3/40 (2013.01)

(58) Field of Classification Search
CPC ...... C09D 127/18; C09D 127/20; C09D 5/02; C09D 201/04; C09D 7/40; C09D 7/61; C08K 3/22; C08K 3/36; C08K 3/40
USPC ........................................................ 524/423
See application file for complete search history.

(56) References Cited

U.S. PATENT DOCUMENTS

| | | | | |
|---|---|---|---|---|
| 3,769,252 A | * | 10/1973 | Fujii et al. ................. | C08J 3/09 523/221 |
| 2002/0017516 A1 | * | 2/2002 | McKeen ............... | A47J 36/022 219/450.1 |
| 2004/0071987 A1 | * | 4/2004 | Bate .......................... | C08J 7/04 428/447 |
| 2006/0234063 A1 | | 10/2006 | Sasaki et al. | |
| 2008/0264864 A1 | * | 10/2008 | Dadalas .................... | C08F 6/16 210/656 |
| 2010/0080955 A1 | | 4/2010 | Harvey et al. | |
| 2011/0306716 A1 | * | 12/2011 | Harvey ................... | C08L 27/18 524/520 |
| 2013/0022740 A1 | * | 1/2013 | Harvey ................... | C08L 27/18 427/180 |
| 2013/0289175 A1 | | 10/2013 | Liu | |

FOREIGN PATENT DOCUMENTS

| | | | |
|---|---|---|---|
| CN | 1407869 A | | 4/2003 |
| JP | 49-17017 B1 | | 4/1974 |
| JP | 59-168592 U | | 11/1984 |
| JP | 59-201992 A | | 11/1984 |
| JP | 59201992 A | * | 11/1984 |
| JP | 63265969 A | * | 10/1988 |
| JP | 1-261514 A | | 10/1989 |
| JP | 2000-140752 A | | 5/2000 |
| JP | 2003-147256 A | | 5/2003 |
| JP | 2005272771 A | * | 10/2005 |
| JP | 2006-297685 A | | 11/2006 |
| JP | 2013-99937 A | | 5/2013 |

(Continued)

OTHER PUBLICATIONS

Communication dated Jul. 10, 2018, from the European Patent Office in counterpart European Application No. 16764620.7.
Database WPI Week 200412 Thomson Scientific, London, GB; AN 2004-112410 XP-002782233.
International Preliminary Report on Patentability with a Translation of Written Opinion issued from the International Bureau in counterpart International Application No. PCT/JP2016/054844, dated Sep. 28, 2017.

(Continued)

*Primary Examiner* — Michael Bernshteyn
(74) *Attorney, Agent, or Firm* — Sughrue Mion, PLLC

(57) ABSTRACT

The present invention provides a coating composition that can provide a coating film excellent in adhesion to a substrate and also excellent in non-adhesiveness, hardness at high temperature, and abrasion resistance. The present invention relates to a coating composition including: non-melt-fabricable polytetrafluoroethylene; a fluorine-containing polymer other than the non-melt-fabricable polytetrafluoroethylene; and a heat-resistant resin other than the non-melt-fabricable polytetrafluoroethylene or the fluorine-containing polymer, the non-melt-fabricable polytetrafluoroethylene being contained in an amount of 10 to 60% by mass relative to the amount of the fluorine-containing polymer.

8 Claims, No Drawings

(56) References Cited

FOREIGN PATENT DOCUMENTS

| | | |
|---|---|---|
| JP | 2013-231098 A | 11/2013 |
| WO | 01/45541 A1 | 6/2001 |
| WO | 2008/060463 A1 | 5/2008 |
| WO | 2014/148385 A1 | 9/2014 |

OTHER PUBLICATIONS

International Search Report of PCT/JP2016/054844 dated May 24, 2016 [PCT/ISA/210].

\* cited by examiner

COATING COMPOSITION AND COATED ARTICLE

CROSS REFERENCE TO RELATED APPLICATIONS

This application is a National Stage of International Application No. PCT/JP2016/054844, filed Feb. 19, 2016, claiming priority based on Japanese Patent Application No. 2015-051060, filed Mar. 13, 2015, the contents of all of which are incorporated herein by reference in their entirety.

TECHNICAL FIELD

The present invention relates to a coating composition and a coated article.

BACKGROUND ART

Cooking utensils (e.g., frying pans, electric griddles, pots, and inner pots of rice cookers) are commonly provided with a coating layer of a fluororesin excellent in properties such as heat resistance, non-adhesiveness, and stain resistance, on a metal substrate of aluminum, stainless steel, or the like for the purpose of preventing scorching or sticking of cooking ingredients during cooking with heat.

Patent Literature 1 discloses an article including an at least single-layered coating containing inorganic and/or organic pigment(s), a fluoropolymer, and, as a binding resin, at least one of polyamide-imide, polyimide, polyetherimide, polyethersulfone, polyphenylene sulfide, polyether ketone, and a silicone resin or a mixture of at least two of these. The fluoropolymer used is a mixture of at least one fluoropolymer that is not fabricable from a molten state and at least one thermoplastic fluoropolymer. The weight proportion of the thermoplastic fluoropolymer is 20% by weight at the maximum of the fluoropolymer that is not fabricable from a molten state.

CITATION LIST

Patent Literature

Patent Literature 1: JP 2000-140752 A

SUMMARY OF INVENTION

Technical Problem

The adhesion between the coating film and the substrate, and properties of the coating film such as non-adhesiveness, and hardness at high temperature and abrasion resistance are still desired to be improved.

The present invention aims to provide, in consideration of the state of the art, a coating composition that can provide a coating film excellent in adhesion to a substrate and also excellent in non-adhesiveness, hardness at high temperature, and abrasion resistance.

Solution to Problem

The present inventors found out that the above problems can be solved by using two fluororesins including non-melt-fabricable polytetrafluoroethylene and a fluorine-containing polymer and setting the ratio of these within a predetermined range, thereby completing the present invention.

Specifically, the present invention relates to a coating composition including: non-melt-fabricable polytetrafluoroethylene; a fluorine-containing polymer other than the non-melt-fabricable polytetrafluoroethylene; and a heat-resistant resin other than the non-melt-fabricable polytetrafluoroethylene or the fluorine-containing polymer, the non-melt-fabricable polytetrafluoroethylene being contained in an amount of 10 to 60% by mass relative to the amount of the fluorine-containing polymer.

The fluorine-containing polymer is preferably low-molecular-weight polytetrafluoroethylene.

The fluorine-containing polymer is preferably at least one selected from the group consisting of a tetrafluoroethylene/perfluoro(alkyl vinyl ether) copolymer, and a tetrafluoroethylene/hexafluoropropylene copolymer.

The heat-resistant resin preferably has a continuously usable temperature of 150° C. or higher.

The heat-resistant resin is preferably at least one selected from the group consisting of a polyamide-imide resin, a polyimide resin, a polyethersulfone resin, a polyether imide resin, a polyether ether ketone resin, an aromatic polyester resin, and a polyarylene sulfide resin.

The coating composition preferably further includes a filler having a new Mohs hardness of 7 or higher.

The filler is preferably at least one selected from the group consisting of diamond, fluorinated diamond, corundum, silica stone, boron nitride, boron carbide, silicon carbide, silica, mica, chrysoberyl, topaz, beryl, garnet, quartz, glass flake, fused zirconia, tantalum carbide, titanium carbide, alumina, and tungsten carbide.

The coating composition preferably further includes water.

The present invention also encompasses a coated article including: a substrate; and a coating film formed of the coating composition formed on the substrate.

Advantageous Effects of Invention

Having the above constitution, the coating composition of the present invention can be directly applied to a substrate, and the resulting coating film is excellent in adhesion to the substrate, and also excellent in non-adhesiveness, hardness at high temperature, and abrasion resistance. The coating composition of the present invention is therefore useful as a one-coat coating composition.

Having the above configuration, the coated article of the present invention includes a film and a substrate firmly adhering to each other and is excellent in non-adhesiveness, hardness at high temperature, and abrasion resistance. Including a coating film formed of the coating composition, the coated article of the present invention is excellent in non-adhesiveness, hardness at high temperature, and abrasion resistance even in the case of consisting only of two layers which are the substrate and the coating film.

DESCRIPTION OF EMBODIMENTS

The present invention is specifically described in the following.

The present invention is characterized in that it contains two fluororesins including non-melt-fabricable polytetrafluoroethylene (PTFE) and a fluorine-containing polymer other than the non-melt-fabricable PTFE. This characteristic allows the composition to provide a coating film excellent in adhesion to a substrate and also excellent in non-adhesiveness, hardness at high temperature, and abrasion resistance.

The coating composition is also characterized in that the amount of the non-melt-fabricable PTFE is 10 to 60% by mass relative to the amount of the fluorine-containing polymer. The amount of the non-melt-fabricable PTFE is preferably 15% by mass or more and 55% by mass or less. If the amount of the non-melt-fabricable PTFE is too large, the non-adhesiveness of the coating film may be poor. By contrast, if the amount of the non-melt-fabricable PTFE is too small, the hardness at high temperature and abrasion resistance of the coating film may be poor.

The term "non-melt-fabricable" refers to a property that the melt flow rate cannot be measured in conformity with ASTM D 1238 and D 2116 at a temperature higher than the crystallization melting point.

The non-melt-fabricable PTFE preferably has fibrillation properties. The fibrillation properties refer to properties of being easily fibrillated to form fibrils. The presence of the fibrillation properties can be confirmed by "paste extrusion", a typical method of molding "high-molecular-weight PTFE powder" that is a powder prepared from a polymer of TFE, because the fibrillation properties of the high-molecular-weight PTFE enables paste extrusion thereof. In the case where an unfired molded product obtained by the paste extrusion has substantially no strength or elongation, for example, in the case where the molded product has an elongation of 0% and is broken when pulled, the molded product is considered to have no fibrillation properties.

The non-melt-fabricable PTFE preferably has a standard specific gravity (SSG) of 2.130 to 2.230. The SSG is more preferably 2.130 to 2.190, still more preferably 2.140 to 2.170. When the SSG of the non-melt-fabricable PTFE is within the above range, a coating film further excellent in hardness at high temperature and abrasion resistance can be formed. The SSG is a value measured in conformity with ASTM D 4895.

The non-melt-fabricable PTFE preferably has a peak top (DSC melting point) within the range of 333° C. to 347° C. in a heat-of-fusion curve of the non-melt-fabricable PTFE having no history of being heated to a temperature of 300° C. or higher. The heat-of-fusion curve is obtained using a differential scanning calorimeter at a rate of temperature rise of 10° C./min. The non-melt-fabricable PTFE has a peak top within the range of more preferably 333° C. to 345° C., still more preferably 340° C. to 345° C. The peak top (DSC melting point) within the above range enables formation of a coating film further excellent in hardness at high temperature and abrasion resistance.

Specifically, the differential scanning calorimetry (DSC) is performed in such a manner that RDC220 (SII Nanotechnology Inc.) is temperature-calibrated beforehand using indium and lead as standard samples, about 3 mg of PTFE powder is placed in an aluminum pan (crimped container), and the temperature is raised at a rate of 10° C./rain within a temperature range from 250° C. to 380° C. in an air current having a flow rate of 200 ml/min. Indium, lead, and tin are used as the standard samples for heat quantity calibration, and the aluminum pan is used as a measurement reference in an empty and sealed condition. The obtained heat-of-fusion curve is analyzed using Muse standard analysis software (SII Nanotechnology Inc.) to determine a temperature indicating the peak top of the quantity of heat of fusion as a DSC melting point.

The non-melt-fabricable PTFE may be either modified polytetrafluoroethylene (hereafter, also referred to as "modified PTFE") or homo-polytetrafluoroethylene (hereafter, also referred to as "homo-PTFE").

The modified PTFE is one prepared from tetrafluoroethylene (TFE) and a monomer other than TFE (hereafter, also referred to as a "modifying monomer").

The modifying monomer is not particularly limited as long as it is copolymerizable with TFE. Examples thereof include: perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkyl ethylenes; and ethylene. A single modifying monomer or multiple modifying monomers may be used.

The perfluorovinyl ethers are not particularly limited, and examples thereof include an unsaturated perfluoro compound represented by the formula (1):

$$CF_2=CF-ORf \quad (1),$$

where Rf represents a perfluoro organic group. The "perfluoro organic group" as used herein refers to an organic group in which all the hydrogen atoms bonded to carbon atoms are substituted with fluorine atoms. The perfluoro organic group may have ether oxygen.

Examples of the perfluorovinyl ethers include perfluoro (alkyl vinyl ether)(PAVE) which is a compound represented by the formula (1) where Rf is a C1-010 perfluoroalkyl group. The carbon number of the perfluoroalkyl group is preferably 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group. Preferred is a perfluoro (propyl vinyl ether) (PPVE) in which the perfluoroalkyl group is a perfluoropropyl group. In other words, the PAVE is preferably perfluoropropyl vinyl ether (PPVE).

Examples of the perfluorovinyl ethers further include a compound represented by the formula (1) where Rf is a C4-C9 perfluoro(alkoxyalkyl) group, a compound represented by the formula (1) where Rf is a group represented by the following formula:

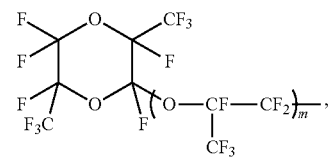

where m is an integer of 0 or 1 to 4, and a compound represented by the formula (1) where Rf is a group represented by the following formula:

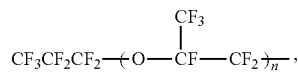

where n is an integer of 1 to 4.

The perfluoroalkyl ethylenes (PFAEs) are not particularly limited, and examples thereof include perfluorobutylethylene (PFBE) and perfluorohexylethylene.

The modifying monomer of the modified PTFE is preferably at least one selected from the group consisting of HFP, CTFE, VDF, PAVE, PFAE, and ethylene. The modifying monomer is more preferably PAVE, still more preferably PPVE.

The homo-PTFE substantially consists only of a TFE unit, and is preferably, for example, one obtained by not using a modifying monomer.

The modified PTFE has a modifying monomer unit in an amount of preferably 0.001 to 2 mol %, more preferably 0.001 to 1 mol %.

The amounts of the respective monomers included in the PTFE herein can be calculated by techniques such as NMR, FT-IR, elemental analysis, and fluorescence X-ray analysis combined as appropriate in accordance with the kinds of the monomers.

The coating composition of the present invention further includes a fluorine-containing polymer. The fluorine-containing polymer is a fluorine-containing polymer other than the non-melt-fabricable PTFE. The fluorine-containing polymer is preferably at least one selected from the group consisting of low-molecular-weight PTFE, TFE/PAVE copolymers (PFA), TFE/HFP copolymers (FEP), ethylene (Et)/TFE copolymers (ETFE), Et/TFE/HFP copolymers, polychlorotrifluoroethylene (PCTFE), CTFE/TFE copolymers, Et/CTFE copolymers, and polyvinylidene fluoride (PVDF), more preferably at least one selected from the group consisting of low-molecular-weight PTFE, PFA, and FEP.

The fluorine-containing polymer is preferably melt-fabricable. The term "melt-fabricable" means that the polymer can be molten and fabricated using a conventional fabrication device such as an extruder or an injection molding apparatus. The fluorine-containing polymer therefore commonly has a melt flow rate (MFR) of 0.01 to 100 g/10 min.

The MFR as used herein is a value obtained as the mass (g/10 min) of the polymer flown from a nozzle (inner diameter: 2 mm, length: 8 mm) per 10 minutes measured in conformity with ASTM D 1238 using a melt indexer (Yasuda Seiki Seisakusho Ltd.) at a measuring temperature (e.g., 372° C. for PFA and FEP, 297° C. for ETFE) and a load (e.g., 5 kg for PFA, FEP, and ETFE) each determined in accordance with the kind of the fluoropolymer.

The fluorine-containing polymer has a melting point of preferably 100° C. to 333° C., more preferably 140° C. or higher, still more preferably 160° C. or higher, particularly preferably 180° C. or higher, and more preferably 332° C. or lower.

The melting point of the fluorine-containing polymer as used herein is a temperature corresponding to the maximum value of a heat-of-fusion curve obtained by increasing the temperature using a differential scanning calorimeter (DSC) at a rate of 10° C./rain. This method is the same as the method of measuring the melting point of the non-melt-fabricable PTFE.

The fluorine-containing polymer is preferably low-molecular-weight PTFE. The low-molecular-weight PTFE is preferably melt-fabricable.

The low-molecular-weight PTFE preferably has a number average molecular weight of 600,000 or less. "High-molecular weight PTFE" having a number average molecular weight of more than 600,000 is non-melt-fabricable and exhibits fibrilation properties that are peculiar to PTFE (see JP H10-147617 A, for example).

The low-molecular-weight PTFE preferably has no fibrillation properties. The low-molecular weight PTFE that is not fibrillated does not give a continuous extrudate (extruded strand) by paste extrusion.

The low-molecular-weight PTFE preferably has a melt viscosity at 380° C. of 1 to $1 \times 10^7$ Pa·s. The melt viscosity within the above range enables formation of a coating film further excellent in non-adhesiveness, hardness at high temperature, and abrasion resistance.

The melt viscosity can be measured by preheating 2 g of a test sample at a measurement temperature (380° C.) for five minutes and performing the measurement thereon with a load of 0.7 MPa using a flow tester (Shimadzu Corporation) and a 2φ-8L die in conformity with ASTM D 1238, while the temperature is maintained at the above temperature.

The low-molecular-weight PTFE preferably has a peak top (DSC melting point) within the range of 322° C. to 333° C. in a heat-of-fusion curve of the PTFE having no history of being heated to a temperature of 300° C. or higher. The heat-of-fusion curve is obtained using a differential scanning calorimeter at a rate of temperature rise of 10° C./min. The low-molecular-weight PTFE has a peak top within the range of more preferably 325° C. to 332° C. The peak top (DSC melting point) within the above range enables formation of a coating film further excellent in non-adhesiveness, hardness at high temperature, and abrasion resistance.

The low-molecular-weight PTFE may be either modified PTFE or homo-PTFE. The modifying monomer included in the modified PTFE may be any of those exemplified above.

The melt-fabricable fluorine-containing polymer is also preferably at least one selected from the group consisting of PFA and FEP.

The PFA is not particularly limited, and is preferably a copolymer including a TFE unit and a PAVE unit at a molar ratio (TFE unit/PAVE unit) of 70/30 or higher and less than 99/1. The molar ratio is more preferably 70/30 or higher and 98.9/1.1 or lower, still more preferably 80/20 or higher and 98.9/1.1 or lower. If the amount of the TFE unit is too small, the mechanical properties tend to be lowered. If the amount of the TFE unit is too large, the melting point tends to be too high, resulting in lower moldability. The PFA is also preferably a copolymer including 0.1 to 10 mol % of a monomer unit derived from a monomer copolymerizable with TFE and PAVE and 90 to 99.9 mol % of the total of the TFE unit and the PAVE unit. Examples of the monomer copolymerizable with TFE and PAVE include HFP; vinyl monomers represented by $CZ^3Z^4=CZ^5(CF_2)_nZ^6$ where $Z^3$, $Z^4$, and $Z^5$ may be the same as or different from each other and each represent a hydrogen atom or a fluorine atom, $Z^6$ represents a hydrogen atom, a fluorine atom, or a chlorine atom, and n represents an integer of 2 to 10; and alkyl perfluorovinyl ether derivatives represented by $CF_2=CF-OCH_2-Rf^7$ where $Rf^7$ represents a C1-C5 perfluoroalkyl group.

The PFA has a melting point of preferably 180° C. or higher and lower than 322° C., more preferably 230° C. to 320° C., still more preferably 280° C. to 320° C.

The melting point as used herein is a temperature corresponding to the maximum value of a heat-of-fusion curve obtained by increasing the temperature using a differential scanning calorimeter (DSC) at a rate of 10° C./min.

The PFA preferably has a melt flow rate (MFR) of 1 to 100 g/10 min.

The PFA preferably has a thermal decomposition starting temperature of 380° C. or higher. The thermal decomposition starting temperature is more preferably 400° C. or higher, still more preferably 410° C. or higher.

The thermal decomposition starting temperature as used herein refers to a temperature at which a sample (10 mg) is reduced by 1% by mass when the sample is heated from a room temperature at a rate of temperature rise of 10° C./min using a thermogravimetric differential thermal analyzer (TG-DTA) (trade name: TG/DTA6200, Seiko Instruments Inc.).

The FEP is not particularly limited, and is preferably a copolymer including a TFE unit and a HFP unit at a molar ratio (TFE unit/HFP unit) of 70/30 or higher and lower than 99/1. The molar ratio is more preferably 70/30 or higher and 98.9/1.1 or lower, still more preferably 80/20 or higher and 98.9/1.1 or lower. If the amount of the TFE unit is too small, mechanical properties tend to be lowered. If the amount of the TFE unit is too large, the melting point tends to be too high, resulting in lower moldability. The FEP is also preferably a copolymer including 0.1 to 10 mol % of a monomer unit derived from a monomer copolymerizable with TFE and HFP and 90 to 99.9 mol % of the total of the TFE unit and the HFP unit. Examples of the monomer copolymerizable with TFE and HFP include PAVE and alkyl perfluorovinyl ether derivatives.

The FEP has a melting point of preferably 150° C. or higher and lower than 322° C., more preferably 200° C. to 320° C., still more preferably 240° C. to 320°

The FEP preferably has a MFR of 1 to 100 g/10 min.

The FEP preferably has a thermal decomposition starting temperature of 360° C. or higher. The thermal decomposition starting temperature is more preferably 380° C. or higher, still more preferably 390° C. or higher.

The amounts of the respective monomer units included in the fluorine-containing polymer can be calculated by techniques such as NMR, FT-IR, elemental analysis, and fluorescence X-ray analysis combined as appropriate in accordance with the kinds of the monomers.

The coating composition of the present invention further contains a heat-resistant resin other than the non-melt-fabricable PTFE or the fluorine-containing polymer.

The heat-resistant resin preferably has a continuously usable temperature of 150° C. or higher.

The heat-resistant resin is preferably at least one selected from the group consisting of polyamide imide resins, polyimide resins, polyether sulfone resins, polyetherimide resins, polyether ether ketone resins, aromatic polyester resins, and polyarylene sulfide resins.

The polyamide imide resins (PAI) are resins each formed of a polymer having an amide bond and an imide bond in the molecular structure. The PAI is not particularly limited, and examples thereof include resins formed of any high molecular weight polymer obtained by any of the following reactions: a reaction between an aromatic diamine having an amide bond in the molecule and an aromatic tetravalent carboxylic acid (e.g., pyromellitic acid); a reaction between an aromatic trivalent carboxylic acid (e.g., trimellitic anhydride) and a diamine (e.g., 4,4-diaminophenyl ether) or a diisocyanate (e.g., diphenylmethane diisocyanate); and a reaction between a dibasic acid having an aromatic imide ring in the molecule and a diamine. For excellent heat resistance, the PAI is preferably a resin formed of a polymer having an aromatic ring in the main chain.

The polyimide resins (PI) are resins each formed of a polymer having an imide bond in the molecular structure. The PI is not particularly limited, and examples thereof include resins formed of any high molecular weight polymer obtained by a reaction of an aromatic tetravalent carboxylic anhydride such as pyromellitic anhydride. For excellent heat resistance, the PI is preferably a resin formed of a polymer having an aromatic ring in the main chain.

The polyether sulfone resins (PES) are resins each formed of a polymer having a repeating unit represented by the following formula.

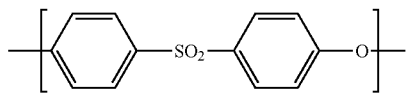

The PES is not particularly limited, and examples thereof include resins formed of any polymer obtained by polycondensation of dichlorodiphenyl sulfone and bisphenol.

For the purpose of forming a coating film excellent in adhesion to a substrate and also excellent in non-adhesiveness, hardness at high temperature, and abrasion resistance, the heat-resistant resin is preferably at least one resin selected from the group consisting of PAIs, PIs, and PESs. PAIs, PIs, and PESs may be used alone or may be used in combination of two or more in each group.

For excellent adhesion to the substrate and heat resistance, the heat-resistant resin is more preferably at least one resin selected from the group consisting of PAIs and PIs.

For excellent corrosion resistance and steam resistance, the heat-resistant resin is preferably a mixture of a PES and at least one selected from the group consisting of PAIs and PIs. In other words, the heat-resistant resin may be a mixture of a PES and a PAI, a mixture of a PES and a PI, or a mixture of a PES, a PAI, and a PI. The heat-resistant resin is particularly preferably a mixture of a PES and a PAI.

In the case where the heat-resistant resin includes a PES and one of a PAI and a PI or both of them, the amount of the PES is preferably 5 to 60% by mass of the total amount of the PES and the PAI and PI. The amount of the PES is more preferably 10 to 40% by mass.

In the coating composition, the amount of the heat-resistant resin is preferably 15 to 85% by mass, more preferably 20% by mass or more and 80% by mass or less, relative to the total amount of the non-melt-fabricable PTFE and the fluorine-containing polymer. The amount of the heat-resistant resin within the above range enables formation of a coating film further excellent in adhesion to a substrate and also further excellent in non-adhesiveness, hardness at high temperature, and abrasion resistance.

The coating composition of the present invention preferably contains a filler having a new Mohs hardness of 7 or higher. Containing a filler having a specific hardness, the coating composition of the present invention can form a coating film further excellent in adhesion to a substrate and also further excellent in non-adhesiveness, hardness at high temperature, and abrasion resistance.

The filler is preferably at least one selected from the group consisting of diamond, fluorinated diamond, corundum, silica stone, boron nitride, boron carbide, silicon carbide, silica, mica, chrysoberyl, topaz, beryl, garnet, quartz, glass flake, fused zirconia, tantalum carbide, titanium carbide, alumina, and tungsten carbide, more preferably at least one selected from the group consisting of diamond, boron carbide, silicon carbide, alumina, and fused zirconia, still more preferably at least one selected from the group consisting of diamond and silicon carbide.

Fluorinated diamond can be obtained by fluorination of diamond. Diamond can be fluorinated, for example, by a known method disclosed in Abstract of the 26th fluorine conference of Japan, Nov. 14, 2002, pp. 24-25. Specifically, diamond is sealed in a reactor made of a material having a corrosion resistance against fluorine such as nickel or an alloy including nickel, and fluorine gas is introduced thereinto for fluorination.

In the coating composition, the amount of the filler is preferably 0.1 to 10% by mass, more preferably 0.3% by mass or more and 5.0% by mass or less, relative to the total amount of the non-melt-fabricable PTFE, the fluorine-containing polymer, and the heat-resistant resin. The amount of the filler within the above range enables formation of a coating film further excellent in adhesion to a substrate and also further excellent in non-adhesiveness, hardness at high temperature, and abrasion resistance.

The coating composition may be either liquid or powder, and is preferably liquid. The coating composition may contain water or an organic solvent, preferably contains water and an organic solvent. The coating composition is preferably an aqueous coating composition.

In the case where the coating composition contains water or an organic solvent, for preparation of a composition that is easy to handle and can form a coating film with excellent physical properties, the coating composition preferably has a solid content concentration of 5 to 70% by mass, more preferably 10% by mass or more and 60% by mass or less.

The coating composition also preferably contains a surfactant. The surfactant may be a conventionally known surfactant.

The coating composition can be prepared by a conventional mixing method such as a method of mixing the non-melt-fabricable PTFE, the fluorine-containing polymer, the heat-resistant resin, the inorganic particles, and optionally water and/or an organic solvent and the surfactant using a mixer or a roll mill.

The coating composition may further contain any additive. The additive is not particularly limited, and examples thereof include leveling agents, solid lubricants, precipitation inhibitors, moisture absorbents, surface conditioners, thixotropic agents, viscosity modifiers, anti-gelling agents, ultraviolet absorbers, photostabilizers, plasticizers, anti-flooding agents, anti-skinning agents, scratch inhibitors, fungicides, antibiotics, antioxidants, antistatics, silane-coupling agents, carbon black, clay, extender pigments, scaly pigments, barium sulfate, glass, various reinforcing materials, various fillers, conductive fillers, and metal powders of gold, silver, copper, platinum, or stainless steel.

The amount of the additive is preferably 0.1 to 30% by mass, more preferably 1% by mass or more and 25% by mass or less, relative to the total amount of the non-melt-fabricable PTFE, the fluorine-containing polymer, and the heat-resistant resin.

A coating film can be formed by application of the coating composition to a substrate. The coating film to be formed is excellent in adhesion to a substrate and also excellent in non-adhesiveness, hardness at high temperature, and abrasion resistance.

The coating composition can be applied over and over, but can form a coating film having desired properties by single application. The coating composition can be suitably used as a one-coat coating composition. Moreover, the coating composition can form a thick coating film by single application.

The coating composition may be applied by any method. Examples of the method include spray coating, roll coating, doctor blade coating, dip (immersion) coating, impregnation coating, spin-flow coating, and curtain-flow coating. Preferred is spray coating.

After application of the coating composition, the coating film may be either dried or fired. The drying is preferably performed at a temperature of 70° C. to 300° C. for 5 to 60 minutes. The firing is preferably performed at a temperature of 260° C. to 410° C. for 10 to 30 minutes.

The present invention also encompasses a coated article including a substrate and a coating film formed of the coating composition formed on the substrate. The coated article is excellent in non-adhesiveness, hardness at high temperature, and abrasion resistance even in the case of consisting only of two layers which are the substrate and the coating film. Accordingly, the coated article is suitably used as a cooking utensil such as a frying pan.

The substrate may be formed of any material, and examples of the material include metals such as simple metals (e.g., iron, aluminum, and copper) and alloys thereof; and non-metallic inorganic materials such as enamel, glass, and ceramic. Examples of the alloys include stainless steel. The substrate is formed of preferably a metal, more preferably aluminum or stainless steel.

The substrate may be subjected to any surface treatment before the use, such as degreasing treatment or surface-roughening treatment, if necessary. The surface-roughening treatment may be performed by any method, and examples thereof include chemical etching with acid or alkali, anodizing (formation of anodic oxide coating), and sandblasting.

The coating film has a thickness of preferably 1 to 50 μm, more preferably 5 μm or more and 40 μm or less. If the thickness is too small, the corrosion resistance or abrasion resistance may be poor. If the thickness is too large, the coating film may easily crack.

The coating film can be formed by applying the coating composition to the substrate by the above method, and optionally drying and then firing the applied composition.

The coated article may include a layer other than the substrate or the coating film. From the standpoint of sufficiently enjoying high adhesion between the substrate and the coating film and the excellent properties of the coating film formed of the coating composition, the coated article preferably consists only of the substrate and the coating film.

The coated article preferably has a substrate separation hardness measured at 200° C. of HB or higher, more preferably F or higher. The substrate separation hardness can be measured in conformity with JIS K 6894.

The coated article having a coating film formed of the coating composition can be used in applications utilizing the non-adhesiveness, heat resistance, smoothness, or other properties of a fluoropolymer. Examples of those utilizing the non-adhesiveness include cooking utensils such as frying pans, pressure cookers, pots, electric skillets, rice cookers, ovens, electric griddles, bread baking pans, knives, and gas cooktops; kitchen utensils such as electric kettles, ice cube trays, metallic molds, and range hoods; parts for the food industry such as mixing rolls, rolling mills, conveyor belts, and hoppers; industrial items such as rolls for office automation (OA) equipment, belts for OA equipment, separation claws for OA equipment, paper-manufacturing rolls, and film-manufacturing calendar rolls; metal molds and releasing tools such as molds for molding expanded polystyrene, casting molds, release plates for production of plywood and/or decorated plywood; and industrial containers (especially, for the semiconductor industry). Examples of those utilizing the smoothness include tools such as saws and files; household utensils such as irons, scissors, and knives; metal foil and electric wires; sliding bearings for food processing equipment, packaging machinery, and spinning and weaving machinery; sliding components for cameras, clocks, and watches; automobile components such as pipes, valves, and bearings; and snow shovels, spades, and chutes.

In particular, the coated article is suitably used for cooking utensils and kitchen utensils, and is especially suitably used for frying pans.

EXAMPLES

The present invention is described with reference to, but not limited to, examples in the following.

The respective numerical values in examples were determined by the following methods.

New Mohs Hardness

The new Mohs hardness of each filler was determined based on the material list shown in the reference and the safety data sheet (SDS) of each filler.

Measurement of Melting Points of Non-Melt-Fabricable PTFE and Fluorine-Containing Polymer The melting point was measured by differential scanning calorimetry (DSC). The DSC was performed in such a manner that about 3 mg of a test sample of non-melt-fabricable PTFE or a fluorine-containing polymer was placed in an aluminum pan (crimped container), and the temperature was raised at a rate of 10° C./min within a temperature range from 250° C. to 380° C. in an air current having a flow rate of 200 ml/min using RDC220 (SII Nanotechnology Inc.). The obtained heat-of-fusion curve was analyzed using Muse standard analysis software (SII NanoTechnology) to determine a temperature indicating the peak top of the quantity of heat of fusion as a DSC melting point.

Production of Coated Plate

A surface of a pure aluminum plate (A-1050P) having a thickness of 2.0 mm was degreased with acetone, and then roughened by sand-blasting so as to have a surface roughness Ra of 2.0 to 3.0 μm determined in conformity with JIS B 1982. Dusts on the surface were removed by air blowing. The coating composition was spray-applied using a gravity-feed spray gun (nozzle diameter: 1.0 mm) at a spraying pressure of 0.2 MPa. The coating film on the aluminum plate was dried at 80° C. to 100° C. for 15 minutes. The coating film was then fired at 380° C. for 20 minutes. In this manner, a coated plate including a coating film having a thickness of about 20 μm was produced.

Non-Adhesiveness

A PTFE ring was placed on the coated plate preheated to 200° C. on an electric griddle, and a test solution (sugar/flour/pure water=10/20/40 (weight ratio)) was poured into the ring. The test solution was fired at 200° C. for seven minutes, the PTFE ring was pulled straight up using a spring scale, and the solidified substance of the test solution was peeled off the coated plate. The non-adhesiveness was evaluated based on the appearance (amount of scorched substance on the plate, sticking strength of scorched substance) of the plate after the test.
1: The solidified substance of the test solution was totally left on the test plate and could not be peeled off.
2: The solidified substance of the test solution was totally left on the test plate and could be peeled off by scratching with nails.
3: The solidified substance of the test solution was partly left on the test plate and could be peeled off by scratching with nails.
4: The solidified substance of the test solution was partly left on the test plate and could be peeled off by rubbing with fingers.
5: The solidified substance was hardly left on the test plate.

Pencil Hardness (at Room Temperature or 200° C.)

Using a pencil hardness tester equipped with a hot stage, the highest hardness of the pencil at which the coating film was not broken to expose the substrate was measured at room temperature or 200° C., and the obtained hardness was treated as the pencil hardness (substrate separation hardness). Tables show the results. Symbols in the tables such as F and 2B indicate the hardness degree of pencils. "Less than 6B" means that the hardness is lower than 6B.

Abrasion Resistance

A pad for industrial use (trade name: Scotch-Brite 7447C) available from 3M Co. was cut into a size of 3 cm square. A 1-cc portion of a 5% neutral detergent was dropped thereon, and the pad was reciprocated on the laminate at a load of 4.5 kg. For every 1000 reciprocating motions, the pad was replaced. The abrasion resistance was evaluated by the number of reciprocating motions until the substrate was exposed.

Cross-Cut Test (Adhesion)

The test was performed in conformity with JIS K5400 (cellophane tape stripping was repeated 10 times).

Production Example 1: Preparation of Polyamide-Imide Resin Aqueous Dispersion

A polyamide-imide resin (hereafter, referred to as PAI) varnish (prepared by dissolving 29 parts by mass of PAI (solid content) in 71 parts by mass of N-methyl-2-pyrrolidone) was put into water and pulverized using a ball mill for a predetermined time, thereby preparing a dispersion (hereafter, referred to as PAI aqueous dispersion) having an average particle size of 2 μm. The obtained dispersion had a solid content of 20% by mass.

Production Example 2: Preparation of Carbon Black Aqueous Dispersion

To 118 g of pure water were added 40 g of a polyether nonionic surfactant having a concentration of 20% by mass, 40 g of carbon black, and 2.2 g of diethyl ethanolamine to prepare a mixture. Then, the mixture was pulverized using a sand mill for a predetermined time to prepare a carbon black aqueous dispersion. The obtained dispersion had a solid content of 20% by mass.

Production Example 3: Preparation of Barium Sulfate Aqueous Dispersion

To 61 g of pure water were sequentially added 30 g of a polyether noninoic surfactant having a concentration of 20% by mass and 35 g of barium sulfate to prepare a mixture. Then, the mixture was pulverized using a sand mill to prepare a barium sulfate aqueous dispersion. The obtained dispersion had a solid content of 28% by mass.

Examples 1 and 2 and Comparative Examples 1 to 5

To the carbon black aqueous dispersion were added a PTFE aqueous dispersion (melting point of PTFE: 344° C., average particle size: 0.28 μm, solid content: 60% by mass, non-melt-fabricable PTFE) and a low-molecular-weight PTFE aqueous dispersion (melting point of low-molecular-weight PTFE: 327° C., average particle size: 0.26 μm, solid content: 40% by mass). Then, the PAI aqueous dispersion, the barium sulfate aqueous dispersion, and silicon carbide (average particle size: 18 μm, new Mohs hardness: 13) were added. Next, methyl cellulose was added as a thickener in an amount of 0.7% by mass relative to the solid content, and polyoxyethylene tridecyl ether (HLB=10) was added as a dispersion stabilizer in an amount of 6% by mass relative to the solid content, thereby preparing an aqueous dispersion having a solid content of 24% by mass. Table 1 shows the mass ratios of the respective components in each of the examples and comparative examples. The mass ratio of silicon carbide in Examples 1 and 2 and Comparative Examples 1 to 5 was 3.5.

Examples 3 to 5 and Comparative Examples 6 to 10

To the carbon black aqueous dispersion were added a PTFE aqueous dispersion (melting point of PTFE: 344° C., average particle size: 0.28 μm, solid content: 60% by mass, non-melt-fabricable PTFE) and a PFA aqueous dispersion (melting point of PFA: 310° C., average particle size: 0.37 μm, solid content: 50% by mass). Then, the PAI aqueous dispersion, the barium sulfate aqueous dispersion, and silicon carbide (average particle size: 18 μm, new Mohs hardness: 13) were added. Next, methyl cellulose was added as a thickener in an amount of 0.7% by mass relative to the solid content, and polyoxyethylene tridecyl ether (HLB=10) was added as a dispersion stabilizer in an amount of 6% by mass relative to the solid content, thereby preparing an aqueous dispersion having a solid content of 24% by mass. Table 2 shows the mass ratios of the respective components in each of the examples and comparative examples. The mass ratio of silicon carbide in Examples 3 to 5 and Comparative Examples 6 to 10 was 3.5.

TABLE 1

| | (Mass ratio) | | | | |
|---|---|---|---|---|---|
| | Non-melt-fabricable PTFE (A) | Low-molecular-weight PTFE (B) | Polyamide-imide resin | Barium sulfate | Carbon black |
| Comparative Example 1 | 66 | 0 | 34 | 11.5 | 2.3 |
| Comparative Example 3 | 58 | 8 | 34 | 11.5 | 2.3 |

TABLE 1-continued

| | (Mass ratio) | | | | |
|---|---|---|---|---|---|
| | Non-melt-fabricable PTFE (A) | Low-molecular-weight PTFE (B) | Polyamide-imide resin | Barium sulfate | Carbon black |
| Comparative Example 4 | 33 | 33 | 34 | 11.5 | 2.3 |
| Example 1 | 22 | 44 | 34 | 11.5 | 2.3 |
| Example 2 | 11 | 55 | 34 | 11.5 | 2.3 |
| Comparative Example 2 | 0 | 66 | 34 | 11.5 | 2.3 |
| Comparative Example 5 | 22 | 44 | 0 | 11.5 | 2.3 |

TABLE 2

| | (Mass ratio) | | | | |
|---|---|---|---|---|---|
| | Non-melt-fabricable PTFE (A) | PFA (B) | Polyamide-imide resin | Barium sulfate | Carbon black |
| Comparative Example 6 | 56 | 10 | 34 | 11.5 | 2.3 |
| Comparative Example 8 | 58 | 8 | 34 | 11.5 | 2.3 |
| Comparative Example 9 | 33 | 33 | 34 | 11.5 | 2.3 |
| Example 3 | 22 | 44 | 34 | 11.5 | 2.3 |
| Example 4 | 11 | 55 | 34 | 11.5 | 2.3 |
| Comparative Example 7 | 0 | 66 | 34 | 11.5 | 2.3 |
| Example 5 | 19 | 38 | 43 | 11.5 | 2.3 |
| Comparative Example 10 | 22 | 44 | 0 | 11.5 | 2.3 |

TABLE 3

| | A/B ratio (mass %) | Non-adhesiveness | Pencil hardness (room temperature) | Pencil hardness (200° C.) | Abrasion resistance | Cross-cut test |
|---|---|---|---|---|---|---|
| Comparative Example 1 | — | 3 | H | 2B | 2000 | 100/100 |
| Comparative Example 3 | 725 | 3 | H | 2B | 2000 | 100/100 |
| Comparative Example 4 | 100 | 3 | F | 2B | 2000 | 100/100 |
| Example 1 | 50 | 5 | H | F | 2000 | 100/100 |
| Example 2 | 20 | 5 | H | F | 2000 | 100/100 |
| Comparative Example 2 | 0 | 5 | B | 6B | 250 | 100/100 |
| Comparative Example 5 | 50 | 5 | Lower than 6B | Lower than 6B | 9 | 0/100 |

TABLE 4

| | A/B ratio (mass %) | Non-adhesiveness | Pencil hardness (room temperature) | Pencil hardness (200° C.) | Abrasion resistance | Cross-cut test |
|---|---|---|---|---|---|---|
| Comparative Example 6 | 560 | 3 | F | 2B | 1000 | 100/100 |
| Comparative Example 8 | 725 | 3 | F | 2B | 1000 | 100/100 |
| Comparative Example 9 | 100 | 3 | F | B | 1000 | 100/100 |
| Example 3 | 50 | 5 | F | HB | 1000 | 100/100 |
| Example 4 | 20 | 5 | F | HB | 1000 | 100/100 |
| Comparative | 0 | 5 | F | 5B | 1000 | 100/100 |

TABLE 4-continued

| | A/B ratio (mass %) | Non-adhesiveness | Pencil hardness (room temperature) | Pencil hardness (200° C.) | Abrasion resistance | Cross-cut test |
|---|---|---|---|---|---|---|
| Example 7 | | | | | | |
| Example 5 | 50 | 4 | H | HB | 1000 | 100/100 |
| Comparative Example 10 | 50 | 5 | Lower than 6B | Lower than 6B | 11 | 0/100 |

Tables 3 and 4 show that, in the case of A/B=10 to 60% by mass, all the coating film properties including non-adhesiveness, pencil hardness (at room temperature and 200° C.), abrasion resistance, and adhesion (cross-cut test) were excellent, except for Comparative Example 5 and Comparative Example 10.

The invention claimed is:

1. A coated article comprising:
   a substrate; and
   a coating film formed of a coating composition formed on the substrate,
   the coating composition comprising:
   non-melt-fabricable polytetrafluoroethylene;
   a fluorine-containing polymer other than the non-melt-fabricable polytetrafluoroethylene; and
   a heat-resistant resin other than the non-melt-fabricable polytetrafluoroethylene or the fluorine-containing polymer,
   the non-melt-fabricable polytetrafluoroethylene being contained in an amount of 10 to 60% by mass relative to the amount of the fluorine-containing polymer,
   wherein the fluorine-containing polymer is at least one selected from the group consisting of low molecular weight polytetrafluoroethylene and a tetrafluoroethylene/perfluoro(alkyl vinyl ether) copolymer,
   the amount of the heat-resistant resin is 15 to 85% by mass relative to the total amount of the non-melt-fabricable polytetrafluoroethylene and the fluorine-containing polymer, and
   the coated article is a cooking utensil or a kitchen utensil.

2. The coated article according to claim 1,
   wherein the fluorine-containing polymer is low molecular weight polytetrafluoroethylene.

3. The coated article according to claim 1,
   wherein the fluorine-containing polymer is a tetrafluoroethylene/perfluoro(alkyl vinyl ether) copolymer.

4. The coated article according to claim 1,
   wherein the heat-resistant resin has a continuously usable temperature of 150° C. or higher.

5. The coated article according to claim 1,
   wherein the heat-resistant resin is at least one selected from the group consisting of a polyamide-imide resin, a polyimide resin, a polyethersulfone resin, a polyether imide resin, a polyether ether ketone resin, an aromatic polyester resin, and a polyarylene sulfide resin.

6. The coated article according to claim 1, further comprising a filler having a new Mohs hardness of 7 or higher.

7. The coated article according to claim 6,
   wherein the filler is at least one selected from the group consisting of diamond, fluorinated diamond, corundum, silica stone, boron nitride, boron carbide, silicon carbide, silica, mica, chrysoberyl, topaz, beryl, garnet, quartz, glass flake, fused zirconia, tantalum carbide, titanium carbide, alumina, and tungsten carbide.

8. The coated article according to claim 1, wherein the coating composition further comprises water.

* * * * *